No. 887,054. PATENTED MAY 12, 1908.
C. I. J. BARKER.
RAKE.
APPLICATION FILED FEB. 18, 1907.
2 SHEETS—SHEET 1.
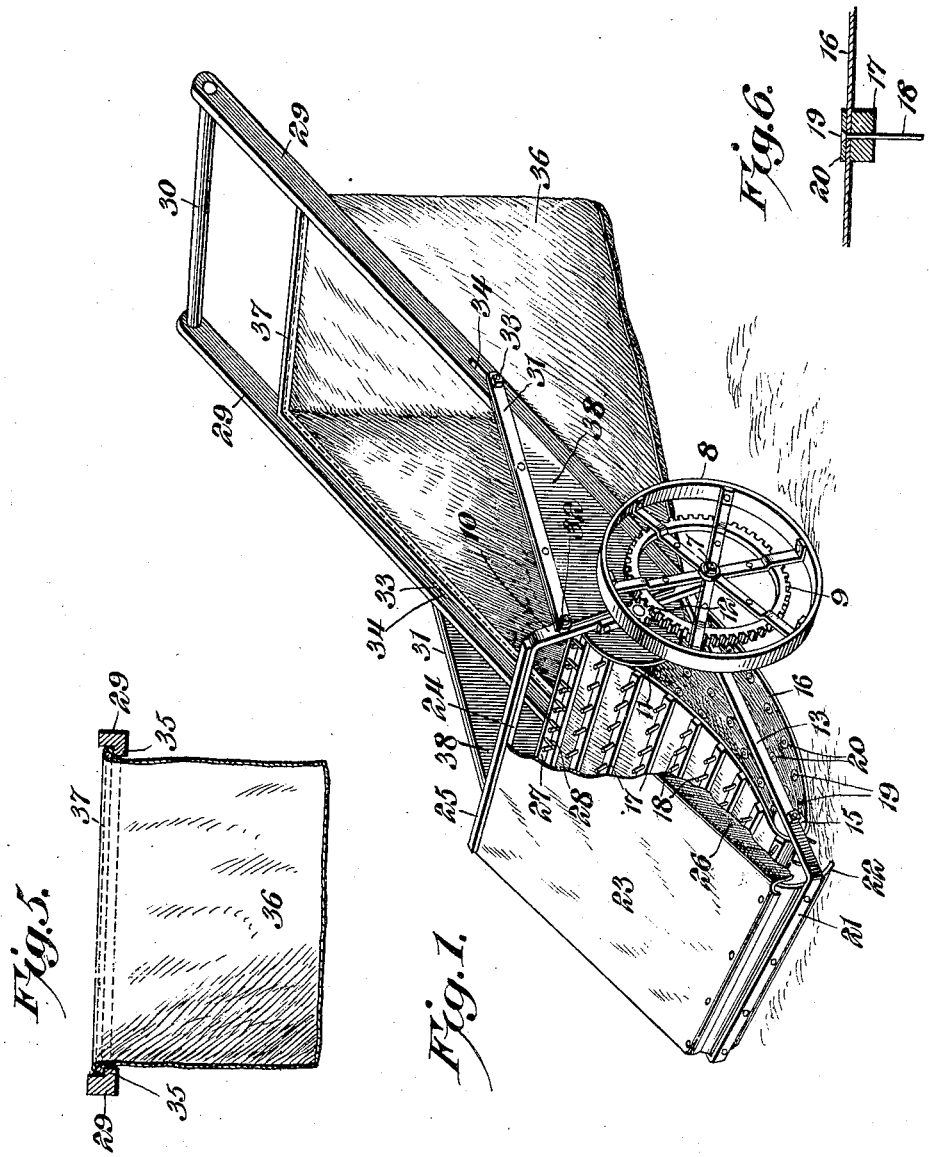
Witnesses
Howard D. Orr.
B. G. Foster
C. I. J. Barker, Inventor,
By E. G. Siggers.
Attorney.

No. 887,054.
PATENTED MAY 12, 1908.
C. I. J. BARKER.
RAKE.
APPLICATION FILED FEB. 18, 1907.
2 SHEETS—SHEET 2.
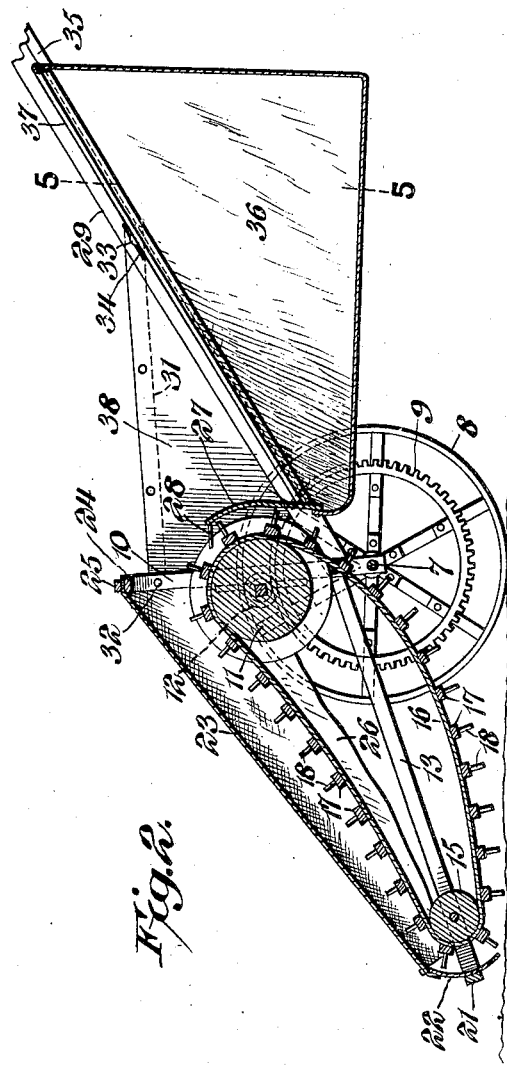
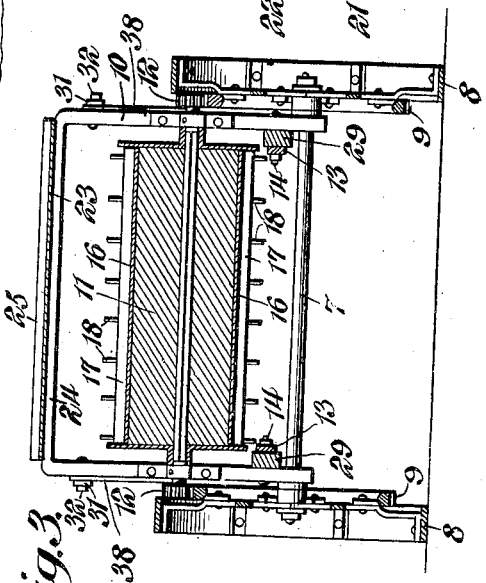
C. I. J. Barker, Inventor,
Witnesses

UNITED STATES PATENT OFFICE.

CLARENCE I. J. BARKER, OF DAVID CITY, NEBRASKA.

RAKE.

No. 887,054.      Specification of Letters Patent.      Patented May 12, 1908.

Application filed February 18, 1907. Serial No. 358,042.

*To all whom it may concern:*

Be it known that I, CLARENCE I. J. BARKER, a citizen of the United States, residing at David City, in the county of Butler and State of Nebraska, have invented a new and useful Rake, of which the following is a specification.

This invention relates more particularly to lawn rakes, and the like, but is clearly applicable to other analogous purposes.

The primary object of the invention is to provide simple, novel and effective mechanism that will collect cut grass, leaves and other loose material that may be scattered over a lawn, upon the propulsion of said mechanism over said lawn, and will deposit such material in a suitable receptacle, said receptacle being readily removable for the purpose of emptying it.

The preferred embodiment of the invention is shown in the accompanying drawings, wherein Figure 1 is a perspective view of the rake, with a portion of the cover broken away. Fig. 2 is a longitudinal sectional view through said rake. Fig. 3 is a cross sectional view. Fig. 4 is a plan view of the wheel support and the front frame, portions being shown in section. Fig. 5 is a vertical sectional view on the line 5—5 of Fig. 2. Fig. 6 is a detail sectional view through a portion of the rake, showing the manner in which the teeth are secured in place.

Similar reference numerals designate corresponding parts in all the figures of the drawings.

In the embodiment disclosed, an axle 7 is provided, on the ends of which are journaled ground wheels 8 that constitute drivers, and are provided with gears 9. Mounted upon the said axle between the wheels, is a substantially upright frame or arch bar 10, on an intermediate portion of which is journaled a roller 11 having projecting gudgeons that carry pinions 12 meshing with the gears 9. A forwardly extending frame or arch bar 13 is pivoted at its rear end by bolts 14 to the upright frame 10, and journaled on the forwardly projecting frame is a roller 15. Extending around the rollers 11 and 15 is an endless rake comprising a flexible belt or apron 16 carrying a plurality of transverse slats 17, from which project teeth or tines 18. As shown, particularly in Figs. 1 and 6, the said teeth or tines are provided at their inner ends with heads 19 that are engaged with disks 20 arranged on the inner side of the belt 16, said teeth or tines passing through the disks, through the belt, and through the slats, and thereby constituting holding means for the last mentioned.

Secured to the front cross bar 21 of the forwardly projecting frame 13 is a curved shield plate 22 and fastened to the upper margin of this plate is a flexible cover 23 that is clamped to the upper cross bar 24 of the upright frame 10 by a bar 25, said cover thus extending over the apron and preferably having depending side walls 26. An upright guard plate 27 is disposed in rear of the roller 11, and is preferably provided with cleaner teeth 28 that coöperate with the teeth 18 of the rake.

A handle is provided comprising spaced side bars 29 that are pivoted at their lower ends to the upright frame by the bolts 14, which pivotally connect the forwardly extending frame thereto. The upper ends of the bars 29 are connected by a handle piece 30. The handle is arranged to be held at different heights by means of links 31 pivoted, as shown at 32 to the upright frame, and having clamping bolts 33 at their ends that engage in slots 34 in the handle bars 29. Said handle bars are furthermore provided on their inner sides with inwardly extending flanges 35, shown more particularly in Fig. 5, and suspended between said bars is a receiving basket 36, preferably of canvas or other suitable material, the basket having a marginal frame 37, around its open side, which rests upon the flanges 35, and thereby supports the said receiving basket. The spaces below the links 32 and above the side arms 29 are closed by plates 38 that are hung from said links 32.

It will be evident from the above, that upon the propulsion of the machine over a lawn or other surface, the ground wheels will, through the medium of the gears 9 and 12, transmit motion to the endless rake. The teeth on the lower stretch of the belt, passing over the surface, will pick up the loose material thereon, and said teeth will elevate it beneath the cover 23, and deposit it in the receiving basket, and when said basket is filled, it may be readily removed, emptied and replaced. The height of the handle may be readily varied by adjusting the bolts 33 in the slots 34, and the mechanism can be quickly and compactly folded, inasmuch as the forwardly projecting frame 13 is pivoted so that it can be swung upwardly, the cover 23 constituting means for holding it in its normal position.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a rake, the combination with relatively movable frames, of a movable rake mounted on both frames, and a flexible cover extending over the rake and connected to both frames for limiting the relative movement thereof.

2. In a rake, the combination with an axle having a driving wheel, of angularly disposed pivotally connected frames supported from the axle, one of said frames extending above the axle, the other projecting in front of the same, rollers journaled on both frames, an endless rake passing about the rollers, a flexible cover connecting the frames and limiting the downward movement of the forwardly projecting frame, handles connected to the upwardly extending frame, and gear connections between the driving wheels and one of the rollers.

3. In a rake, the combination with angularly disposed frames, of a wheeled support therefor, an endless rake mounted on the frames, and a cover for the rake constituting a connection between the frames.

4. In a rake, the combination with an axle, of angularly disposed frames, one of which is pivoted on the axle, the other being pivoted to said frame, a roller journaled on each frame, an endless rake passing about the rollers, and a flexible cover connecting the frames and constituting means for limiting their relative movement away from each other.

5. In a rake, the combination with angularly disposed pivotally connected frames, of a wheeled support therefor, rollers journaled on the frames, an endless rake passing about the rollers, and a cover connecting the outer ends of the frames and extending over the rake, said cover constituting means for limiting the relative movement of the frames.

6. In a rake, the combination with angularly disposed frames, of an endless rake mounted thereon, a shield mounted on the front end of one frame in advance of the rake, and a cover connected to the upper portion of the shield and extending over the rake, said cover being secured to the other frame.

7. In a rake, the combination with an axle, of wheels mounted thereon, an upright frame having its lower end secured to the axle, a forwardly projecting frame pivoted to the upright frame, rollers journaled on the frames, an endless rake passing about the rollers, gearing connecting one of the wheels and the roller that is on the upright frame, a shield secured to the front end of the forwardly projecting end of the frame and being located in advance of the rake, and a cover extending from the shield to the upper end of the upright frame.

8. In a rake, the combination with an upstanding frame, of a forwardly extending frame pivotally associated with the upstanding frame, a rake mounted on the frames, means mounted on the upstanding frame and connected to the forwardly extending frame to maintain the latter at a predetermined height, handles adjustably connected to the upstanding frame, and means connecting the handles and upstanding frame for holding the former at different elevations.

9. In a rake, the combination with an upstanding frame, of a forwardly extending frame pivotally associated with the upstanding frame, a rake mounted on the frames, a flexible cover connected to the upstanding frame and to the forwardly extending frame to maintain the latter at a predetermined elevation, rearwardly extending handles pivotally connected to the upstanding frame, and means connecting the handles and upstanding frame for holding said handles at different elevations.

10. In a rake, the combination with a wheeled support, of a frame mounted thereon, a movable rake mounted on the frame, handles connected to the frame, links connecting the frame and handles, and shields suspended from the links and substantially closing the space below the same and between the handles and frame.

11. In a rake, the combination with a wheeled supporting frame, of an endless rake mounted thereon, handle bars pivotally connected to the frame, links connecting the upper portion of the frame and the intermediate portions of the handle bars, a receiving basket suspended from and between the handle bars, and shield plates suspended from the links and extending downwardly to the handle bars.

12. In a rake, the combination with a wheeled support, of a frame mounted thereon, an endless rake carried by the frame, handle bars connected to the frame and having supporting means on their inner sides, and a receiver having a marginal frame that rests on said supporting means.

13. In a rake, the combination with an axle, of ground wheels journaled thereon, an upright frame carried by the axle, a forwardly projecting frame pivoted at its rear end to the upright frame, rollers journaled on the frames, an endless rake passing about the rollers, gear connections between the ground wheels, and the roller that is on the upright frame, a shield carried by the front end of the forwardly projecting frame and disposed in advance of the rake, a flexible cover between the shield and the upper end of the upright frame, and handle bars connected to the upright frame.

In testimony, that I claim the foregoing as my own, I have hereto affixed my signature in the presence of two witnesses.

CLARENCE I. J. BARKER.

Witnesses:
E. K. CROW,
A. H. ETTING.